United States Patent [19]

Darling

[11] Patent Number: 6,127,457
[45] Date of Patent: Oct. 3, 2000

[54] COMPOSITION OF POLYDIMETHYSILOXANE AND MICROBALLOONS

[75] Inventor: Graham D. Darling, Russell, Canada

[73] Assignee: Marine Manufacturing Industries Inc., Nun's Island, Canada

[21] Appl. No.: 09/259,310

[22] Filed: Mar. 1, 1999

Related U.S. Application Data

[63] Continuation of application No. PCT/CA97/00624, Sep. 3, 1997, which is a continuation of application No. 08/697,971, Sep. 3, 1996, Pat. No. 5,895,805.

[51] Int. Cl.$^7$ ........................................................ L08J 9/32
[52] U.S. Cl. ...................... 523/218; 523/223; 524/404; 524/425; 524/437; 524/442; 524/413; 524/588; 525/100; 528/10
[58] Field of Search ..................................... 523/218, 223; 525/100; 528/10; 524/404, 425, 413, 437, 442, 588

[56] References Cited

U.S. PATENT DOCUMENTS 4,060,435  11/1977  Schroeder .

5,507,866  4/1996  Drew et al. .

FOREIGN PATENT DOCUMENTS 0 635 549  1/1995  European Pat. Off. .

*Primary Examiner*—Robert Dawson
*Assistant Examiner*—Jeffrey B. Robertson
*Attorney, Agent, or Firm*—Swabey Ogilvy Renault

[57] ABSTRACT

A composition suitable as a buoyant putty is disclosed, which is a mixture of a discontinuous solid phase of microballoons, and a viscous liquid continuous phase comprising a polydimethylsiloxane; the polydimethylsiloxane of the continuous phase has a viscosity between 100,000 cs and 2,000,000 cs; the viscosity of the polydimethylsiloxane of the continuous phase is achieved by incorporating polydimethylsiloxane molecules of sufficiently high molecular weight; containment within other materials is optional; additional dyes, pigments, particles, fibers, felts or fabrics can confer additional visibility, strength, stiffness, dryness or friction; accompanying properties of malleability, and thermal, electrical, vibratory, shock and acoustical insulation, also make this composition useful for other applications that require such qualities.

24 Claims, No Drawings

COMPOSITION OF POLYDIMETHYSILOXANE AND MICROBALLOONS

CROSS REFERENCE TO RELATED APPLICATIONS

This Application is a Continuation of PCT/CA No. 97/00624, filed Sep. 3, 1997, in which the United States of America was designated and elected, and which remains pending in the International Phase until Mar. 3, 1999, which Application in turn is a continuation of U.S. application Ser. No. 08/697,971, filed Sep. 3, 1996, now U.S. Pat. No. 5,895,805.

FIELD OF INVENTION

This invention relates to a composition comprising a homogeneous continuous phase of polydimethylsiloxane viscous liquid, and a discontinuous phase of microballoons; the invention also relates to a buoyant putty of such composition in which sinkable objects can be wrapped or embedded to keep them afloat, for example if accidentally dropped overboard from a boat, and for other applications.

BACKGROUND ART

Through being denser than the medium in which they have been immersed, many objects that would otherwise endure at least a brief wetting, are often irretrievably lost upon accidental release into deep, clouded or cluttered water, through sinking. Such accidental release may occur during the course of recreational or commercial activities; from a ship, boat, dock, shore, or the body of a wader or swimmer; into a pond, pool, canal, swamp, river, lake or ocean; objects commonly lost in such fashion include glasses, pens, watches, combs, coins, cards, keys, tools, instruments, utensils, jewelry, as well as rods, lures, hooks and other fishing accessories, that contain substantial quantities of metal, glass, ceramic, stone, bone, or most kinds of fibers, rubbers, resins or plastics, or even certain woods such as ebony.

Such losses are always annoying and often costly. It is often not practical, convenient or comfortable to keep such sinkable objects held or tied to a person, boat or shore at all times, nor to permanently incorporate low-density parts or materials into their design for the sole purpose of keeping them afloat in the event of accidental release. Certain buoys or other flotation devices exist of a shape or with accessories that allow them to be temporarily tied or fitted to particular types of sinkable objects during the use of these near water, to be later detached for easier transport or storage. One example of these is the "Aqua Float Rod Floater", from Marine Manufacturing Industries (M.M.I.) Inc., Ile des Soeurs (Montreal), PQ Canada, a "tubular split foam device that fits around a fishing rod between the handle and the first eyelet" (Marine Manufacturing Industries Inc., "Aqua Float: The Fisherman's Friend" (pamphlet), Montreal, PQ, Canada, 1995). Such devices, whether made of wood, plastic or other solid materials, that often contain either one or a few large enclosed spaces, or many small closed cells, that are filled with air or inert gas to reduce overall density, are often of size or shape unsuitable for use with other than a limited variety of sinkable objects. Even pieces of soft closed cellular foams, composed of elastic flexible material that imprisons numerous air bubbles in a permanent arrangement, for example some types of foam rubber or polyurethane, that can be wrapped around sinkable objects of various shapes, will tend to revert to non-wrapping shapes in an elastic manner unless restrained by ties, adhesives or envelopes. Also, though either rigid or soft foams can be cut to accommodate smaller sinkable objects, they cannot thereafter easily be re-joined for use with larger ones.

A better way to protect sinkable objects would use a material that is a putty of lowest possible density that can be inelastically deformed to a new stable shape that surrounds or otherwise holds a sinkable object without need for ties, adhesives or envelopes. Only a sufficient quantity of buoyant putty to float a smaller sinkable object need be detached from a larger mass; or, several such small quantities could be joined to be able to float a larger sinkable object, or to be stored or transported as a larger mass.

The lowest density that can be achieved with a homogeneous organic material that can be inelastically deformed, for example, unvulcanized rubber, oligoisobutylene or similar flowable hydrocarbon, is about 0.910 g/mL. Since this density is not much less than that of water, fresh water having a density of 1 g/mL, relatively large quantities of such material would be necessary to float most sinkable objects. To enable the greater buoyancy that would be necessary for practical applications, substantial quantities of air or other gas would therefore need to be incorporated, for the lowest possible overall density. However, a material that would be capable of inelastic deformation through flow would not be able to retain loose air bubbles, each of which would eventually break and release its air on contact with the outside surface, or merge on contact with other bubbles to form larger and still unstable voids, thus causing phase-separation within the mass, and even breaking it up to release a held sinkable object. Also, a flowable material that is homogeneous, even if buoyant, would continue to flow under even very mild forces, and thus would not be able to sufficiently retain a shape that could hold a sinkable object in the manner of a putty.

Surrounding each of many tiny air bubbles in its own membrane as a microballoon (also called hollow microsphere, and so distinct from solid or porous microspheres) would allow them all to be retained, evenly dispersed, within the mass of a highly viscous fluid, yet allow them to slide past each other as a portion of the material is inelastically deformed to a new shape. Such a material would now be highly buoyant; moreover, it would have the desirable consistency and flow properties of a putty, by analogy with other heterogeneous composite mixtures that are putties.

A putty is generally formulated as a simple composite material that usually consists of a collection of discrete particles, such as powdered calcium carbonate, as the discontinuous phase, suspended in a viscous liquid, such as oil, as the continuous phase. A certain minimum force is required to overcome the static friction between the particles; below this critical force the material tends to retain the shape given it. This mechanical property has allowed "putties" or "caulks" to be used for centuries to seal small cracks in boats or housing, by forming a plug within a hole that, in contrast with flowable homogeneous materials, does not continue to flow out under gravity or water pressure. In general, the volume of viscous liquid in a putty must be sufficient to fill the voids between the particles, but not so much as to allow the particles to settle and the liquid to exude for the whole material to phase-separate. In the case of approximately spherical particles, the volume-to-volume ratio of continuous to discontinuous phases would thus be a function of geometry, that is independent of the average size of the particles, though a larger distribution of particle sizes makes for relatively less void space available to be filled by liquid. The same volume-to-volume ratio for a putty would be more or less independent of the chemical compositions of the two phases, though their weight-to-weight ratio would depend on their relative densities. A classic composition uses ca. 15% w/w (which corresponds to 34% v/v) of water-insoluble vegetable oil as continuous phase, with inorganic whiting (powdered calcium carbonate) as discontinuous phase ("Putty", Encyclopedia Britannica William Benton Publisher, Chicago Ill. USA y1966 v18 p888); other compositions substitute Fuller's earth (clay) for the discontinuous phase. More modern compositions use low-molecular-weight polysulphides, silicones, or oligomeric hydrocarbons as the "oil" or "continuous" phase, and a wide variety of materials as "filler" or "discontinuous phase" ("Sealants" Kirk-OthmerEncyclopedia of Chemical Technology Wiley, New York N.Y. USA y1978 v20 p549–558). Sometimes also the continuous phase consists of or includes monomer that can be cured to a rigid matrix after the desired shape has been formed.

The required qualities for a composition of matter that would be a buoyant putty to hold sinkable objects would be: lowest possible density for maximum buoyancy; malleability towards deliberate shaping by hand without the mass breaking or crumbling, yet sufficient stiffness that it does lose hold of a sinkable object through flow due to gravity or normal manipulation of the object; self-adhering and cohesive so that it does not crumble or break upon deliberate hand manipulation, and that it can be made to wrap around a sinkable object as a continuous ring or band and thus hold it against forces of gravitation or normal manipulation, yet not adhesive and not leaving either solid crumbs or liquid stains on hands and other surfaces; non-toxic towards handling or accidental ingestion; odorless and resistant to decay; inert and non-absorbent towards water; non-flammable and inert to air; not damaged by light, vibration or shock; retains essential mechanical properties within temperature of normal use, for example, −40° C. to +40° C.; long shelf and storage life without curing to a solid that cannot be shaped by hand, nor breaking down to a liquid that loses form due to mere gravity or normal manipulation of a held sinkable object; through incorporation of appropriate dyes or pigments, can be made brightly coloured, reflective, fluorescent or phosphorescent for easy location of held sinkable object on water surface; through incorporation of appropriate particles or fibers, can be made stronger, stiffer, drier-feeling or more frictional where necessary; ease and low cost of production. Though able to function as a buoyant putty by itself, optionally such a composition of matter could also be enclosed in a flexible envelope which need not be impermeable to liquids, for example a woven or knitted fabric, that could also be fitted with ties or adhesives to better hold or contain a sinkable object. It could also be employed as a layer between other layers of other materials, or held within holes or pockets formed by other materials. Furthermore, such an air-rich composition would necessarily ("Cellular Materials" Encyclopedia of Polymer Science andEngineering Interscience Publishers, New York N.Y. USA y1985 v3 p1ff) have additional properties of thermal, electrical, vibratory, shock and acoustical insulation that would also make it useful for applications that require such insulation properties together with both malleability and stiffness; it could also be useful as a permanently-flexible, low-density sealant.

The prior art has no examples that meet all these requirements together.

U.S. Pat. No. 5,459,959 to Daniel L. Paradis issued Oct. 24, 1995 describes a "Fish strike indicator composition" that is a moldable, buoyant composition comprising either unexpanded or expanded EXPANCEL® expandable thermoplastic microspheres dispersed in equal volumes of corn syrup or other sugar component, and hydrocarbon resin. While still in unexpanded form, the EXPANCEL® microspheres are mixed with the other components, then the entire composition is heated in a microwave oven to expand the microspheres to their final size and (microballoon) form and fill the package. This composition has the disadvantages of being sticky, subject to biodegradation, and detectably water-absorbing, which last the inventor suggests can be offset by adding hydrophobic silica—a relatively dense ingredient—in mass equal to the microspheres. This same patent also mentions "Strike Putty #835L", sold by ORVIS® Company of Manchester Vt. USA, a "clay like" material composed of glass microballoons and hydrocarbon resins, which has the disadvantages of relatively poor buoyancy (density 0.6 g/mL), and a tendency to absorb water on repeated or prolonged use.

U.S. Pat. No. 5,421,874 to Tony M. Pierce issued Jun. 6, 1995 describes a "composite microsphere and lubricant mixture" for use within flexible containers for cushions and padding, in which the microballoons can be plastic and the lubricant can be silicone-based, possessing "a low specific gravity, low thermal mass, low coefficient of heat transfer, insulative and flotation qualities". This patent specifies that the lubricant must be a low-viscosity liquid, such as soapy water or other liquid of similar consistency, explicitly excluding more viscous "lubricants which impede rather than facilitate sliding and rolling movement of spherical objects with each other, such as stiff wax", so that the entire composite mixture has a "low shearing force threshold", being "quick to flow" that it may function as a cushioning material in a chair or bed without even temporarily-perceptible bumps, which would be a disadvantage for a buoyant putty that must be sufficiently stiff and strong to retain a sinkable object against gravity and normal manipulation of the object, and that thus requires a highly viscous liquid as the continuous phase. Again with the object of making the composition less stiff, this patent also specifies that the low-viscosity "lubricant means is present on the exterior surface of essentially all of said spherical objects, but in a quantity less than would cause dispersion of said spherical objects in said lubricant means", with a preferred embodiment of 1 g/mL liquids being mixed with plastic microballoons to give a "specific gravity for the composite mixture of about 0.2 to 0.25 or less", which composition would have the disadvantage in a buoyant putty of having a low cohesive strength for holding a sinkable object; mention of other embodiments with densities "above 0.50" clearly refers to compositions with denser continuous, for example, fluorocarbon, or discontinuous, for example, solid or thicker-walled glass, ceramic or metal microspheres, phases, rather than a higher volume-to-volume ratio of continuous-to-discontinuous phases. This prior art would also have the disadvantage of the composition having to be confined in a liquid-impermeable flexible bladder or flexible container, to keep the mass from flowing or breaking apart due to low shearing force threshold and low cohesive strength respectively, and to block the exudation of its low-viscosity liquid.

Other U.S. Pat. Nos. 5,362,543 to Lincoln P. Nickerson issued Nov. 8, 1994, 4,728,551 to Eric C. Jay issued Mar. 1, 1988, and 4,255,202 to Jack C. Swan issued Mar. 10, 1981, all describe "flowable pressure compensating fitting materials which are used in seating applications". Here the continuous phase is a low-viscosity oil or a more viscous mixture of oil with wax, fatty amide or denser colloidal silica that form a fine suspension in the oil, and the discontinuous phase consists of glass or plastic microballoons to reduce overall density to some extent. In particular, the Nickerson patent teaches a continuous phase made of an oil that is a polydimethylsiloxane of viscosity below 100 cs, together with at least 3 wt % of a fatty amide thickener that is insoluble in the oil. All these materials have the disadvantage that the low-molecular weight oil is able to seep past the suspended wax microcrystals or fatty amide particles or colloidal silica that are meant to increase its apparent bulk viscosity, as well as past the microballoons, so as to collect at the surface of a portion of the material, thus requiring a liquid-impermeable flexible envelope to contain such exudation, and tending to exhibit phase-separation even within such envelope. For similar reasons, these materials also have the disadvantage of low cohesive strength for a buoyant putty holding a sinkable object.

Prior-art U.S. Pat. No. 5,607,993 to Christy issued Mar. 4, 1997 for "Low-Density Bouncing Putty" employs a "borosilicone rubber base" that is subject to hydrolysis to low-viscosity products on prolonged contact with water, and so is unsuitable as a buoyant putty; and that also includes a toxic borate component that pose a hazard to children and pets.

U.S. Pat. No. 5,202,362 to Jules J. Hermale issued Apr. 13, 1993 describes a composite of silicone fluid and thermoplastic microballoons, but the silicone fluid is again of low viscosity (20,000 cs) that would mean low cohesive strength and exudation, and moreover contains reactive groups so that it can be cured to a solid mass upon injection into the ear, which would be disadvantageous for a moldable buoyant putty. Prior art U.S. Pat. Nos. 4,000,108 to Yokokawa et al issued Dec. 28, 1976 and 4,861,804 to Nakanishi issued Aug. 29, 1989 for polysiloxane-microballoon composites also employ polysiloxanes that are curable so as to crosslink to non-flowing gels with the same disadvantage.

SUMMARY OF THE INVENTION

It is an object of this invention to provide a composition of matter that is a mixture of polydimethylsiloxane viscous liquid and microballoons that can hold sinkable objects to keep them afloat.

It is another object of the invention to provide a composition of matter that is a buoyant putty comprising low-density gas-filled microballoons, also called hollow microspheres, dispersed in a hydrophobic viscous liquid medium, being at once very buoyant and having the mechanical properties normally associated with putties.

It is another object of this invention to provide a composition that is of lowest possible density for highest possible buoyancy.

It is another object of this invention to provide a composition that is malleable enough to be shaped, separated or joined by deliberate hand manipulation so as to be made to hold a sinkable object, yet stiff enough to retain its form without sag or flow in the absence of such deliberate manipulation, and to continue to hold a sinkable object against separation and sinking.

It is another object of this invention to provide a composition which can provide a smooth surface and can closely conform to the exterior of a sinkable object.

It is another object of this invention to provide a composition that is cohesive enough not to crumble or break while being moulded, unless deliberately pulled apart.

It is another object of this invention to provide a composition that can be divided or joined by deliberate hand manipulation to produce pieces of the desired size to hold a particular sinkable object.

It is another object of this invention to provide a composition that does not adhere to, nor leave solid or liquid residue, on either the hands during moulding, the sinkable object it holds, or any surface it may rest upon, alone or while holding a sinkable object, for short or prolonged periods.

It is another object of this invention to provide a composition that can hold a sinkable object by wrapping either completely or only partially around it.

It is another object of this invention to provide a composition that can be deliberately removed from a sinkable object and stored, to be later reused to hold another sinkable object.

It is another object of this invention to provide a composition that is unaffected by water.

It is another object of this invention to provide a composition that is odourless, nontoxic, non-flammable, and stable for long periods towards heat, cold, vibration, shock, air, light and microbial action.

It is another object of this invention to provide a composition that can be coloured or otherwise made visible against a water surface or most other backgrounds from a distance under poor lighting conditions.

It is another object of this invention to provide a composition that can be made more strong, stiff or frictional, for those applications requiring these qualities.

It is another object of this invention to provide a composition that is easy to produce by moderately rapid blending of available ingredients.

It is another object of this invention to provide a composition that optionally may be enclosed in a flexible envelope which need not be liquid-impermeable, for example a knitted or woven fabric.

It is another object of this invention to provide a composition that optionally may be employed as a layer between other layers of other materials, or held within holes or pockets formed by other materials.

It is another object of this invention to provide a composition that can be employed for other applications in which its lightness, malleability, and thermal, electrical, vibratory, shock and acoustical insulating abilities would be advantageous.

In accordance with the invention there is provided a composition having a continuous viscous liquid phase comprising a polydimethylsiloxane, and a discontinuous phase of microballoons, said polydimethylsiloxane liquid phase having a viscosity greater than 100,000 cs, and less than 2,000,000 cs.

In accordance with another aspect of the invention, there is provided a composition that renders an object which sinks in water, buoyant in water, comprising applying about the object a buoyant putty composition of the invention in an amount to render the object buoyant in water.

In accordance with a particular embodiment of the invention there is provided a composition that is a buoyant flotation putty for supportably floating in water an object which sinks in water, comprising a continuous phase of a viscous hydrophobic liquid vehicle and a discontinuous phase comprising microballoons, said continuous phase being present in an amount only sufficient to fill the void volume between the microballoons, said putty having a density less than that of water such that said putty floats in water, said putty being co-adhesive while exhibiting low adhesion.

DESCRIPTION OF PREFERRED EMBODIMENTS

The composition of the invention has particular application as a buoyant putty suitable for supportably floating in water an object which would otherwise sink in water. The object may be wrapped, embedded or otherwise held in a suitable amount of the putty to render it floatable in water.

When the composition is employed as a buoyant putty, the continuous phase is preferably employed in a volume which is sufficient to fill the void volume between the microballoons, but not substantially greater than the void volume; the purpose of this is to minimize the density of the composition; employing a volume of the continuous phase greater than that required to fill the void volume has the effect of unnecessarily increasing the density of the putty and thus rendering the putty less-buoyant, and also increases its tendency to undesired sag, flow and exudation. Insofar as density may be less critical in other applications of the composition, this maximum volume requirement for the continuous phase will be less important.

In general, the liquid continuous phase should comprise at least 98 parts, and in particular 98 to 100 parts, by volume of the polydimethylsiloxane or mixture of polydimethylsiloxanes per 100 parts by volume of the continuous phase. Thus there may be up to 2 parts by volume of liquid additives such as dyes in the liquid phase.

In general, the solid discontinuous phase comprises at least 65 parts and thus 65 to 100 parts, and preferably at least 98 parts, by volume of microballoons per 100 parts by volume of the continuous phase. Thus there may be up to 45 parts by volume of solids other than the microballoons in the discontinuous.

The volume of the continuous phase relative to the total volume of the composition is greater than or equal to the minimum that is required for said continuous phase to entirely fill the void volume of the discontinuous phase, but not exceeding 56% more of said minimum relative volume.

Either the continuous phase or the discontinuous phase may further comprise up to 2 parts by volume of a dye or pigment, based on 100 parts of the respective phase.

The discontinuous phase may further comprise up to 33 parts by volume of particles, fibers, filaments, felts or fabrics, of composition selected from sand, glass, silica, alumina, calcium carbonate, calcium silicate including wollastonite, kaolin, talc, barite, mica, asbestos, fly ash, ceramic, boron carbide, silicon carbide, boron nitride, zirconia, boron, aluminum, copper, bronze, iron, steel, carbon, cellulose, wool, silk, hair, bone, polyimide, polyester, polyethylene, and polyamide including nylon and aramid, based on 100 parts by volume of the discontinuous phase.

When the composition is to form a buoyant putty, the composition suitably contains the continuous phase in an amount ranging from 25 to 39, preferably 26 to 31 parts by volume, per 100 parts by volume, of the composition; the microballoons forming the discontinuous phase are suitably present in the composition in an amount ranging from 61 to 75, preferably 69 to 74 parts by volume, per 100 parts by volume, of the composition; and, with organic polymer microballoons, the composition suitably has a density ranging from 0.26 to 0.40, preferably 0.27 to 0.32 g/mL.

The microballoons (also called hollow microspheres) in the composition of the invention may be filled with air, or nitrogen or similarly inert gas. They should be as light as possible, yet strong enough so as not to be crushed while blending or using the composition. Organic polymer or plastic is therefore generally to be preferred over glass or ceramic as giving acceptable strength for the least mass, and as having a more hydrophobic native surface to adsorb less water. Such organic polymer microballoons are also referred to herein as plastic microballoons. The plastic should be one able to withstand environmental conditions of storage or use of the composition. Smaller microballoons give a smoother texture to the buoyant putty for a closer fit, and better grip, on the sinkable object being held; per unit volume used, smaller microballoons have more surface in contact with the intervening viscous liquid, for a more cohesive composition that is less prone to exudation and phase separation. Suitable microballoons typically have a true density (i.e. mass/volume where "volume" does not include the void volume between the individual microballoons) of less than 0.10 g/mL and a diameter of less than 1 mm and typically from 15–200 $\mu$m; more especially they may have a mean diameter of about 100 $\mu$m. Suitable microballoons include those available from PQ Corporation as PM 6545 Plastic Microspheres of vinyl chloride-acrylonitrile copolymer, and which are sufficiently strong, light (0.02 g/mL), heat-stable (to 120° C.), and small (having a mean diameter ca. 100 $\mu$m, with 15–200 $\mu$m range).

The composition exhibits self-adhesion, in other words it is co-adhesive, but is non-tacky and displays low adhesion to surfaces.

Thus, when employed as a buoyant putty, an object is embedded in the composition or encased or enwrapped, at least in part, by the composition so that reliance is made on the cohesive nature of the composition to engagingly hold the object. It is not necessary that the object being completely enclosed by the composition and indeed this will not normally be desirable; thus, for example, a band of the composition may surround a portion of a fountain pen.

For the composition of the invention to be sufficiently stiff, cohesive and non-exuding, it has been found that the viscosity of the continuous liquid phase must exceed 100,000 cs (centistokes), and preferably exceed 200,000 cs. This eliminates from consideration such hydrophobic liquids that are "oils" including peanut oil and other vegetable oils, epoxidized soybean oil, even "heavy" paraffin or mineral oils, and silicone oil or fluid of viscosity of 100,000 cs or less. Of the more viscous hydrophobic oligomers and polymers that are liquids to −40° C., polyisobutylenes such as the Indopol(trade-mark) series H-40, H-300, H-1500 and H-1900 of increasing viscosity, from Amoco Inc., even and particularly when more viscous than 100,000 cs, are unacceptably sticky to hands and other surfaces; so too are polyisoprenes that also contain reactive alkene groups that make them subject to viscosity change through autoxidation, while fluorocarbons are relatively dense and expensive, and polysulphides dense and typically smelly.

Polydimethylsiloxanes are well-known for their antistick properties, which make them useful as mould-release agents. They are also used to coat textiles and other solid articles to confer water repellence, and as ingredients in cosmetics and polishes. The higher atomic number of silicon makes them slightly denser (0.98 g/mL) than saturated hydrocarbon polymers, but still less dense than even fresh water. These polymers are inert towards and repel water, though they will wet organic surfaces such as the surface of plastic microballoons; they are odourless, non-toxic, nonflammable, and very stable to air and light. The viscosity of mixtures of polydimethylsiloxanes increases with their weight- average molecular weight: low-molecular weight mixtures are called silicone fluids or silicone oils, while higher molecular weight mixtures of barely discernible flow are called silicone gums. The industry commonly mixes polydimethylsiloxanes of higher and lower weight-average molecular weights to produce polydimethylsiloxanes of intermediate weight-average molecular weights. Polydimethylsiloxanes do not become glassy solids until temperatures below −123° C., and are used as heating media to over +150° C. Though they can be chemically crosslinked with peroxides or by other means to form non-flowable soft or hard gels, in the absence of such curing agents they remain liquids with flow properties that do not greatly change with time, light, moderate heat, or contact with air or water.

General Electric Inc. supplies the Viscasil® series of polydimethylsiloxane liquids of 30,000 cs (VISC-30M), 60,000 cs (VISC-60M) and 100,000 cs (VISC-100M), and others of viscosities below 100,000 cs. However, it has been found that even the VISC-100M by itself was not viscous enough to give a composition with microballoons at any ratio that was sufficiently stiff, cohesive and non-exuding for use as in a buoyant putty. The same company once supplied a 600,000 cs silicone fluid, but this has been discontinued in recent years. Wacker Inc. also supplies a series of polydimethylsiloxanes, of which their Wacker Silicone Fluid AK 500000, of 500,000 cs viscosity, was found suitable as the polydimethylsiloxane component of the invention. Polydimethylsiloxane fluids of sufficiently high viscosity may also be achieved by blending a silicone fluid of 100,000 cs or less, with a high viscosity silicone gum such as SE30 of General Electric; SE30 is a polydimethylsiloxane having, according to the manufacturer, a viscosity well exceeding 2,000,000 cs (i.e. beyond the upper range of apparatus normally used to generate viscosity values in centistokes), and a penetration number of 500 to 1500. The penetration number is used for describing the hardness or viscosity of asphalt or bitumen and other highly viscous liquid (i.e. flowable) substances, as the distance that a standard needle penetrates in a fixed time under standard conditions, with higher values therefore denoting softness or lower viscosity (Corbett, L. W. and R. Urban (1985). "Asphalt and Bitumen." Ullmann's Encyclopedia of IndustrialChemistry. W. Gerhartz Ed., VCH Publishers, Deerfield Beach Fla. USA y1985 vA.3 p169–188). A fluid of too high a viscosity, such as from too much of the high viscosity silicone gum in a polydimethylsiloxane mixture, is difficult to mix with the microballoons, and gives a buoyant putty with properties not improved enough to warrant the extra cost (silicone gum or other more viscous polydimethylsiloxane being a relatively more expensive component), and effort of mixing.

A single silicone fluid of 500,000 cs, or a mixture of substantially equal parts of a silicone fluid of 30,000 cs and a silicone gum having a penetration number of 500 to 1500, have been found especially suitable as the polydimethylsiloxane of the continuous phase of the invention, however, it is within the skill of the art to formulate different polydimethylsiloxanes having the required viscosity of the invention, so as to provide other embodiments of the composition of the invention.

The liquid continuous phase in the composition of the invention has a viscosity of less than 2,000,000 cs.

The viscosity of the continuous phase is also less than a viscosity corresponding to a penetration number of 500.

Among the substances that can be added to a liquid to increase its apparent viscosity, those that do so by forming a microcrystalline suspension without dissolving in the liquid, such as wax, fatty amide or colloidal silica in polydimethylsiloxane fluid, are less able to retain them against undesired exudation or phase-separation, than higher-molecular weight analogs of the liquid's molecules, such as silicone gum in silicone fluid. However, should the polydimethylsiloxane of the continuous phase already be viscous enough to prevent such exudation, additional particulate or fibrous filler can further increase the strength and stiffness of the composition, for applications where such qualities are useful. However, the composition would entirely lose its buoyant quality on substituting microballoons (density ca. 0 g/mL) with non-hollow particles or fibers of, for example, glass (density ca. 3 g/mL), in more than ca. 33% of the volume of the discontinuous phase. For a typical embodiment of the invention having the discontinuous phase occupying 70% of the total volume, this would thus impose a maximum glass content of 23% of the total volume, which is also in the range of glass content for typical fiberglass formulations (J. Wiley "The Fiberglass Repair and Construction Handbook" e2 McGraw-Hill, New York N.Y. USA p59–65).

A gentle stretching and folding action, as is done for preparing bread or other dough, is suitable for preparing the composition of the invention by mixing together the components of its continuous and discontinuous phases without rupturing the microballoons of the discontinuous phase. Though this can be done by hand, a machine capable of such action, such as the planetary Hobart type of doughmaker, or the horizontal-spindle model from Ross Inc., is more suited for preparation of the composition of the invention on a larger scale.

It would help protect a portion of the composition of the invention, and the underlying object it may hold or enclose, against sudden crushing, scratching, gouging, tearing, piercing or cutting damage, to employ an embodiment that is stronger and stiffer, or to enclose the portion with a strong flexible envelope that is either impermeable to liquids, or that is a woven or knitted fabric that is permeable to liquids. Portions of the composition of the invention may also be contained as layers between other layers of other materials, or held within holes or pockets formed by other materials.

The composition of the invention also has other useful qualities of softness, lightness, flexibility, stiffness, non-toxicity, and thermal, electrical, shock, vibration and acoustic insulation, that would also make it useful as a sealant, packaging material, or as an insulating component within supports for engines or other machinery, or in the floors, ceilings or walls of studios, theatres, engine rooms, or other rooms or buildings, or of freezers, refrigerators, coolers, incubators, ovens or other temperature-controlled areas or devices, or of aircraft, boats, cars and other vehicles, or of speakers, microphones or other acoustic devices, or as a filler for lining or padding in boots, jackets, suits, lifejackets, armour, and other articles of regular, sports, work, recreational, police, combat or emergency clothing, or in seats, cushions, pads, beds, grips and other cushioning or vibration-damping devices or furniture, or in medical or veterinary prostheses.

A typical formulation of the invention consists of, by volume, 13.5 parts of SE30 silicone gum, 13.5 parts of VISC-30M silicone fluid, and 73 parts of PM6545 Plastic Microspheres. These ingredients may suitably be combined in a sealed plastic bag, and blended together by manipulating the outside of the sealed bag by hand so that the contents are subjected to a stretching and folding action. The result is a white, stiff, malleable white mass, that is a composition of the invention and a buoyant putty. The density of the product was measured at 0.28 g/mL, by pressing a portion into a measuring spoon of known volume, scraping off the excess and weighing. Another portion of this product felt dry, and did not stick nor leave visible liquid or solid residue when briefly pressed onto hands, leather, wood, linoleum, or woven or knitted cotton, rayon or nylon fabrics or other opaque non-reflecting surfaces; the slightly visible greasy spot left after pressing on clear or reflective glass or plastic could easily be removed by wiping or washing with soap and water. Even after prolonged handling of another portion, only a slight and not unpleasant oiliness, and no stickiness, were felt on the hands. Another portion that was wrapped in finely woven cotton fabric remained contained even after extensive manipulation, the exterior of the fabric only acquiring a slightly more oily feel, and a quality of water-repellence. Another portion retained its approximately spherical shape without sagging for over four months while resting on a solid surface. A hen's egg, wrapped in another portion to a thickness of 1 cm, did not crack on being dropped 1 m onto smooth concrete, whereas an unprotected egg was thoroughly smashed, thus demonstrating ability to insulate against shock.

Increasing quantities of sand or cotton batting can be gradually worked into other portions to give product compositions that are increasingly harder and stiffer. Another portion that was rolled into a cylinder 1 cm wide by 1–3 cm long could be folded 180° without large breaks appearing in its surface, thus establishing its cohesiveness. Over a wide range of viscosities for the continuous phase, samples prepared with relatively more of the microballoons were not cohesive by this last test, even crumbling into several pieces during moulding efforts, probably due to the amount of continuous phase fluid component not being sufficient to fill the void volume between the microballoons. Other samples with less of the microballoons component and more silicone fluid or gum components were denser and no stiffer or stronger. Many other combinations of silicone gum and fluid, including less of the gum with a greater portion of more viscous fluid such as VISC-60M or VISC-100M, or use of Wacker Silicone Fluid AK 500000 alone, as the polydimethylsiloxane of the continuous phase, gave putties of similar consistency when mixed with the same proportion of the microballoons. Exclusive or too high a proportion of lower-viscosity silicone fluids VISC-30M or VISC-60M, or exclusive VISC-100M, gave putties that were very soft and easy to pull apart; exclusive or too high a proportion of the SE30 gum gave putties that were very stiff and hard, that were difficult to mix during their preparation, and to flex and shape once formed; Wacker Silicone Fluid AK 1000000, of 1,000,000 cs viscosity, proved just barely manageable to mix.

Formulations similarly prepared using mixtures of silicone fluid or gum with even small quantities of polyisobutylene were noticeably and unpleasantly sticky.

Substituting the polydimethylsilicone of the continuous phase with borasilicone-based Silly Putty® gave a composition whose strength and stiffness greatly decreased after prolonged contact with water, behaving like unsuitable putties prepared from polydimethylsiloxanes less viscous than 100,000 cs.

The ability of the composition to be coloured was demonstrated by mixing in 1 wt % of "Cadmium Red" fine pigment. The putty was coloured uniformly red throughout without substantial change in its density or consistency.

I claim:

1. A buoyant putty for supportably floating in water an object which sinks in water comprising a composition having a homogeneous viscous liquid continuous phase comprising a polydimethylsiloxane, and a solid discontinuous phase of microballoons, said polydimethylsiloxane having a viscosity greater than 100,000 cs (centistokes) and less than a viscosity corresponding to a penetration number of 500.

2. A buoyant putty according to claim 1 wherein said continuous phase comprises at least 98 parts by volume of polydimethylsiloxane per 100 parts by volume of the continuous phase; and said solid discontinuous phase comprises at least 65 parts by volume of said microballoons per 100 parts by volume of the discontinuous phase.

3. A buoyant putty according to claim 2 wherein said continuous phase has a volume relative to the total volume of the composition which is greater than or equal to the minimum that is required for said continuous phase to entirely fill the void volume of the discontinuous phase, but not exceeding 56% more of said minimum relative volume.

4. A buoyant putty according to claim 1 wherein said viscosity is greater than 100,000 cs and less than 2,000,000 cs.

5. A buoyant putty according to claim 1 in which said microballoons are of organic polymer.

6. A buoyant putty according to claim 5, in which said microballoons are of vinyl chloride-acrylonitrile copolymer.

7. A buoyant putty according to claim 1 in which the microballoons contain a gas selected from air or inert gases.

8. A buoyant putty according to claim 1 in which the microballoons have a true density of less than 0.10 g/mL.

9. A buoyant putty according to claim 1 in which the microballoons are less than 1 mm in diameter.

10. A buoyant putty according to claim 1 in which the microballoons have a diameter ranging from 15–200 $\mu$m, with a mean diameter of about 100 $\mu$m.

11. A buoyant putty according to claim 1 in which the microballoons are expanded by heat to their final size only after mixing with the continuous phase.

12. A buoyant putty according to claim 1 in which said continuous phase is present in an amount which ranges from 25 to 39 parts by volume, based on 100 parts by volume of the composition.

13. A buoyant putty according to claim 10 in which the discontinuous phase comprises microballoons in at least 98 parts by volume per 100 parts by volume of the discontinuous phase, with the density of the composition ranging from 0.26 to 0.40 g/mL.

14. A buoyant putty according to claim 1, in which said continuous phase is present in an amount which ranges from 26 to 31 parts by volume, per 100 parts by volume, of the composition.

15. A buoyant putty according to claim 1, in which the discontinuous phase comprises microballoons in at least 98 parts by volume per 100 parts by volume of the discontinuous phase, with the density of the composition ranging from 0.27 to 0.32 g/mL.

16. A buoyant putty according to claim 2 in which the polydimethylsiloxane is a silicone fluid having a viscosity between 200,000 cs and 600,000 cs.

17. A buoyant putty according to claim 1, in which the polydimethylsiloxane is a silicone fluid having a viscosity of about 500,000 cs.

18. A buoyant putty according to claim 1, in which the polydimethylsiloxane is a mixture of two or more silicone fluids, or of one or more silicone gums with one or more silicone fluids.

19. A buoyant putty according to claim 1, in which the polydimethylsiloxane is a mixture of equal parts of a silicone fluid having a viscosity of about 30,000 cs, and a silicone gum having a penetration number of 500 to 1500.

20. A buoyant putty according to claim 1, in which either the continuous phase or the discontinuous phase further comprises up to 2 parts by volume of a dye or pigment, based on 100 parts by volume of the respective phase.

21. A buoyant putty according to claim 1, in which the discontinuous phase further comprises up to 33 parts by volume of particles, fibers, filaments, felts or fabrics, of composition selected from sand, glass, silica, alumina, calcium carbonate, calcium silicate including wollastonite, kaolin, talc, barite, mica, asbestos, fly ash, ceramic, boron carbide, silicon carbide, boron nitride, zirconia, boron, aluminum, copper, bronze, iron, steel, carbon, cellulose, wool, silk, hair, bone, polyimide, polyester, polyethylene, and polyamide including nylon and aramid, based on 100 parts by volume of the discontinuous phase.

22. A buoyant putty according to claim 1, consisting of said continuous phase in 26 to 31 parts by volume, and said discontinuous phase in 69 to 74 parts by volume, based on 100 parts by volume of the composition; the discontinuous phase comprises microballoons in at least 98 parts by volume based on 100 parts by volume of said discontinuous phase; said microballoons have a diameter of from 15 to 200 $\mu$m, with a mean diameter of about 100 $\mu$m, and a density of 0.02 g/mL; said composition having a density of 0.27 to 0.32 g/mL.

23. A buoyant putty according to claim 1, that holds or encloses an object; or that is enclosed in a flexible envelope including a woven or knitted fabric; or that is a layer between other layers of other materials; or that is held within holes or pockets formed by other materials.

24. A method of rendering an object which sinks in water, buoyant in water comprising applying about said object a buoyant putty as defined in claim 1, in an amount to render said object buoyant in water.

* * * * *